(12) United States Patent
Talbot et al.

(10) Patent No.: US 6,196,788 B1
(45) Date of Patent: Mar. 6, 2001

(54) CONTAINER HANDLING DEVICE AND METHOD

(75) Inventors: Rodney S. Talbot; Thomas M. Ingraham, both of Fort Collins, CO (US)

(73) Assignee: Advanced Manufacturing Technology, Fort Collins, CO (US)

( * ) Notice: Subject to any disclaimer, the term of this patent is extended or adjusted under 35 U.S.C. 154(b) by 0 days.

(21) Appl. No.: 09/435,957

(22) Filed: Nov. 9, 1999

(51) Int. Cl.[7] ................................................. B65G 57/24
(52) U.S. Cl. ..................... 414/802; 53/543; 198/418.6; 414/791.7
(58) Field of Search ............................... 53/531, 537, 540, 53/543, 149; 198/418.1, 418.6; 414/791.7, 801, 802

(56) References Cited

U.S. PATENT DOCUMENTS

| | | |
|---|---|---|
| 2,603,340 * | 7/1952 | Warren et al. ............... 198/418.6 |
| 3,592,002 * | 7/1971 | Alduk ............................ 53/159 |
| 3,897,877 | 8/1975 | VanderMeer et al. . |
| 3,918,598 | 11/1975 | VanderMeer et al. . |
| 4,154,347 | 5/1979 | VanderMeer et al. . |
| 4,251,979 * | 2/1981 | Harigome et al. ............. 53/543 |
| 4,259,826 * | 4/1981 | Campbell ........................ 53/543 |
| 4,277,932 * | 7/1981 | Campbell ........................ 53/497 |
| 4,406,359 | 9/1983 | Cole et al. . |
| 4,500,229 | 2/1985 | Cole et al. . |
| 4,747,252 | 5/1988 | Kapke . |
| 4,753,564 | 6/1988 | Pearce et al. . |
| 4,759,673 | 7/1988 | Pearce et al. . |
| 4,809,965 | 3/1989 | VanderMeer et al. . |
| 4,828,434 | 5/1989 | Fairman et al. . |
| 4,829,743 | 5/1989 | Kapke . |
| 4,829,744 | 5/1989 | Kapke . |
| 4,843,797 * | 7/1989 | Butterly, Jr. et al. ............ 53/448 |
| 4,887,719 | 12/1989 | Kapke . |
| 4,934,508 | 6/1990 | VanderMeer et al. . |
| 4,990,034 | 2/1991 | Kapke et al. . |
| 5,271,709 | 12/1993 | VanderMeer et al. . |
| 5,310,307 | 5/1994 | VanderMeer et al. ........ 414/796.2 |
| 5,320,457 | 6/1994 | VanderMeer et al. ........... 406/88 |
| 5,437,533 | 8/1995 | VanderMeer et al. ........ 414/789.5 |
| 5,501,552 | 3/1996 | Simkowski ....................... 406/52 |
| 5,501,553 | 3/1996 | Simkowski ....................... 406/88 |
| 5,522,692 * | 6/1996 | Simkowski ................ 414/791.7 X |
| 5,555,700 * | 9/1996 | Marti ......................... 198/418.6 X |
| 5,570,977 | 11/1996 | Simkowski et al. ............. 406/88 |
| 5,630,679 | 5/1997 | Simkowski et al. ............. 406/86 |
| 5,716,189 | 2/1998 | Winski et al. ................ 414/799 X |
| 5,733,100 * | 3/1998 | Slat et al. ...................... 414/791.7 |
| 5,746,572 | 5/1998 | Winski ........................... 414/796.3 |
| 5,762,794 | 6/1998 | Simkowski et al. ............. 210/398 |
| 5,803,703 | 9/1998 | Winski ........................... 414/741.6 |
| 5,819,907 | 10/1998 | Simkowski .................... 198/689.1 |
| 5,842,818 | 12/1998 | Simkowski ........................ 406/88 |
| 5,961,275 | 10/1999 | Winski et al. ................ 414/792.6 |

* cited by examiner

Primary Examiner—Janice L. Krizek
(74) Attorney, Agent, or Firm—Harness, Dickey & Pierce, P.L.C.

(57) ABSTRACT

A method and system for packaging a plurality of containers, wherein each container has a body and an engagement lip surrounding a neck portion, which comprises a plurality of steps. First, a set of containers is provided. Next, containers are loaded on a plurality of neck guides and locomoted along the neck guides to a gathering area to form a bundle of containers. The container is lowered onto a conveyor element and transported with the conveyor along a path to a loading area. A transfer device stacks the bundle on a pallet.

12 Claims, 13 Drawing Sheets

CONTAINER HANDLING DEVICE AND METHOD

FIELD OF THE INVENTION

The present invention relates to a container handling system and, more particularly, to a container handling system which stacks a predetermined number of containers in a predetermined configuration for shipping and reduces the need for operator involvement.

BACKGROUND OF THE INVENTION

Currently, various packaging and shipping methods are used to transport containers, such as bottles, from one location to another. Such transportation methods typically involve transporting bottles from a source, such as a manufacturer, to a destination, such as a distributor. Such methods include palletizing layers of vertically orientated bottles upon one another to form a shipping package, wherein the shipping package contains a predetermined number of bottles. Subsequently, the stacked layers of bottles are wrapped or otherwise secured to ensure that they withstand the harshness associated with shipping.

Due to inventory and cost, it is critical that the number of bottles shipped in each container is known and consistent. As such, feeding mechanisms have been devised which ensure that the shipping package contains a predetermined number of bottles. Such mechanisms typically have a conveyor on which a preselected number of bottles are loaded. The bottles are then transported along the conveyor and loaded onto a pallet.

One current method of palletizing bottles is to feed them in from the single lane conveyance onto a four foot wide accumulation conveyor by use of a slow down module. The slow down module has several belts moving at progressively slower speeds, and as the belts get slower the distance between the guides gets wider. A single lane of bottles is fed along the slowdown module. In this way, the single lane line of bottles is changed to a stream of either two wide or three wide. The stream of either two wide or three wide bottles then move down the wider portion of accumulator until they hit the back of a previously accumulated pack. When this happens, the stream spreads out over the entire width of the belt to the edges of the accumulator and are patterned. Once the bottles are patterned, a set of pins comes down and cuts off a layer and sweeps it onto the pallet.

While this method does palletize bottles, it has several drawbacks. Specifically, as the bottles are flowing to the sides of the accumulator, they can either fall over, miss a spot (void), or jumble up such that they are out of pattern. When the pins lower to cut off a layer, then instead of going in-between the bottles, they come down on one and crush it. As such, with this random feed system, an operator is required full time to watch the pattern, fill voids, and make corrections as required.

A second method of palletizing blow molded bottles is to separate the one single lane as described above into six single lanes with one, one-to-two, and two, one-to-three automatic divert gates. The six lanes are then placed on table top conveyance where they are run through a bottle counter. Once the proper number of bottles are counted, a bottle stop closed and the six lanes of bottles are run into the sweep mechanism. The six lanes of bottles are swept at 90 degrees from their entrance direction onto a belt conveyance which takes the bottles to a stop. The sweep mechanism sweeps as many times as it takes to form a complete layer. Once the layer is formed, then it is moved forward and stacked on the pallet. This method also has some drawbacks. Specifically, the bottles are unstable in the sweep mechanism and can tip over during the sweeping process. As a result, the machine is limited speed wise and even at low speed the sweep mechanism is unreliable enough such that an operator needs to be in the area. In addition, the entrance of high speed blow molders into the bottling market are too fast for this concept, thereby requiring multiple palletizing machines to be used. The present invention was developed in light of these and other disadvantages.

SUMMARY OF THE INVENTION

It is therefore an object of the present invention to provide a container material handling system and method which reduces the amount of container tippage during packaging.

It is yet another object of the present invention to provide a container material handling system which quickly and accurately selects and organizes a predetermined number of containers into a layer configuration for stacking.

To accomplish these and other objects, the present invention provides a method for packaging a plurality of containers, wherein each container has a body and an engagement lip surrounding a neck portion, which comprises a plurality of steps. First, a set of containers is provided. Next, the containers are loaded on a plurality of neck guides and locomoted along the neck guides to a gathering area to form a bundle of containers. The container is then lowered onto a conveyor element and transported with the conveyor along a path to a loading area. A transfer device then stacks the bundle on a pallet. In a further aspect of the present invention, the above steps are repeated for a plurality of sequential sets of containers and corresponding bundles until the proper shipping package size is achieved.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
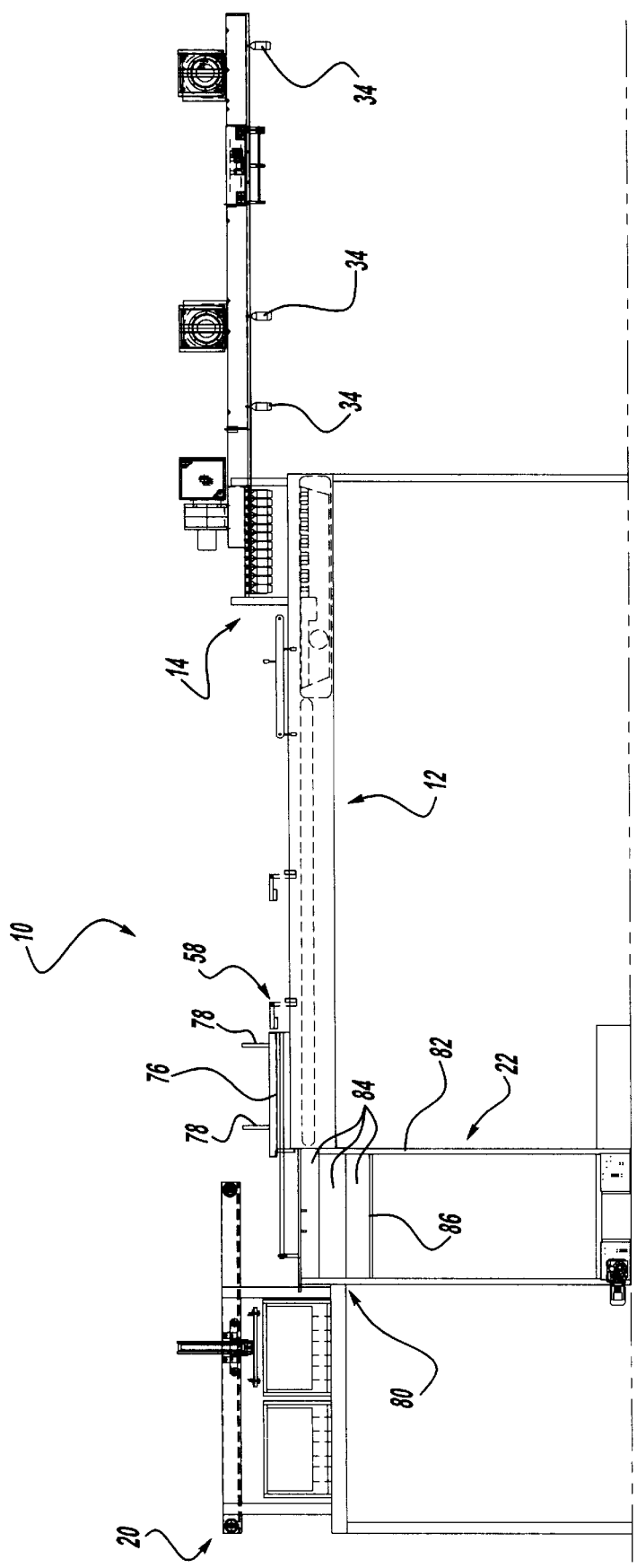
FIG. 1 is a side view of a container material handling system according to the present invention.
Figure 2:
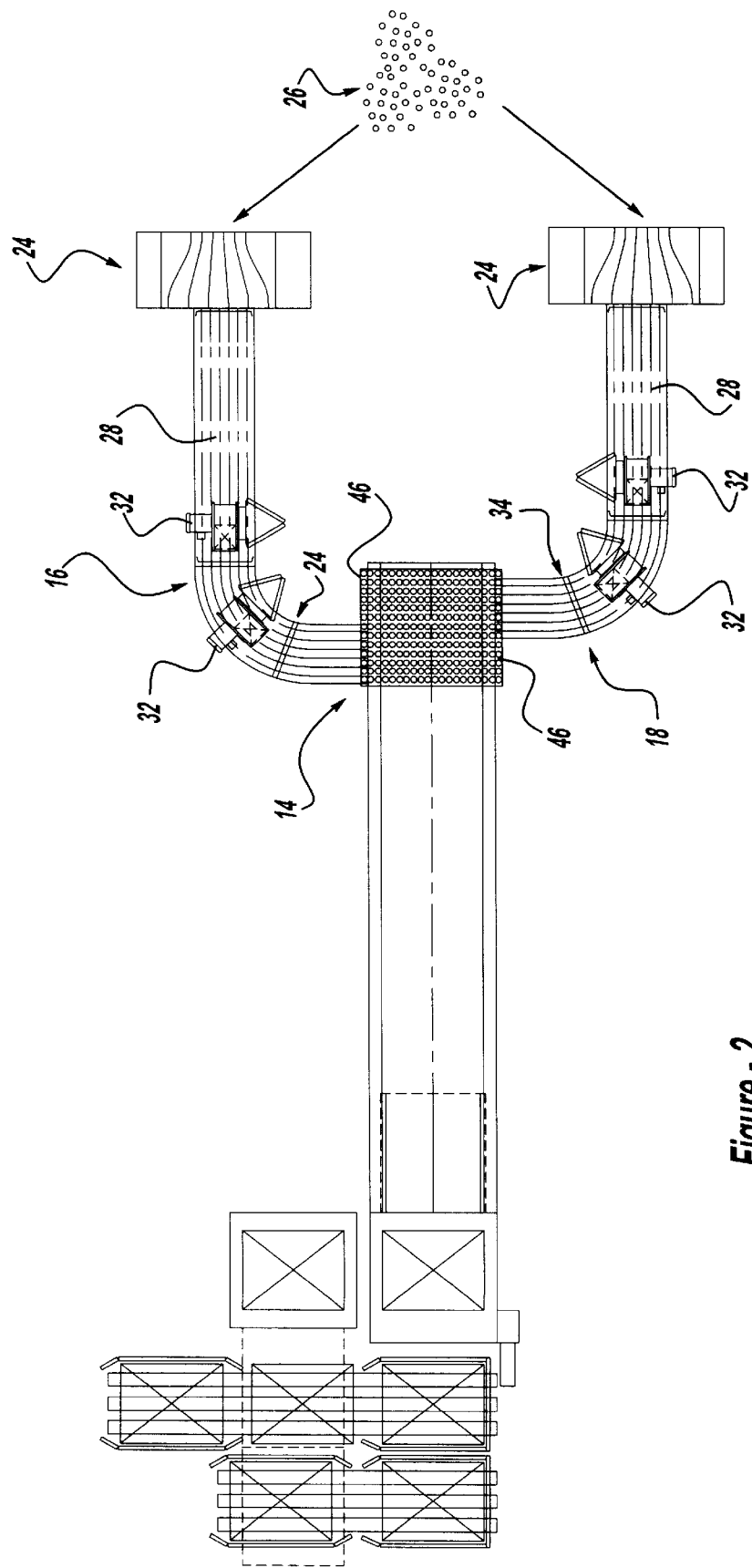
FIG. 2 is a top view of a container material handling system according to the present invention.

In FIGS. 1 and 2, a container handling system 10 generally includes conveyor element 12, elevator device 14, a first set of neck guides 16, a second set of neck guides 18, packaging removal mechanism 20, and pallet holder 22. Preferably, the types of containers for which the present invention is directed are of the type which have a body portion transitioning into a neck portion, wherein the neck portion has an engagement lip extending outwardly therefrom. Such container designs are conducive to being transported by this lip.

First set of neck guides 16 and second set of neck guides 18 each have feeder devices 24 which channel each container of a set of containers 26 into track elements 28. Track elements 28 contain a plurality of adjacent bottleneck guides adapted to engage respective engagement lips of each of the containers 26. As a result, a plurality of individual bottles 34 travel down each independent track of track element 28. Each individual bottle 34 is locomoted by air pressure supplied by compressors 32 along track elements 28 to elevator device 14.

Figure 13:
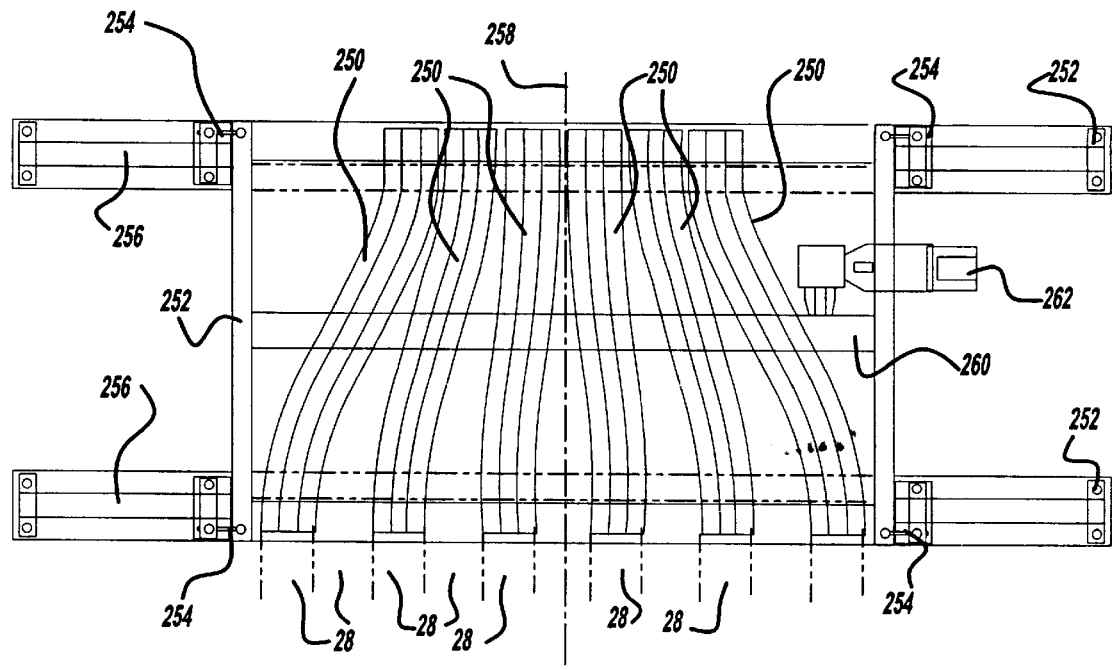
FIG. 13 is a top view of a feeder device for a container material handling system according to the present invention.

Referring to FIG. 13, feeder devices 24 are described in greater detail. Feeder device 24 generally comprises angled track connectors 250 mounted to frame 252. Frame 252 is attached to roller guides 256 by roller elements 254. Roller elements 254 allow angled track connectors 250 and frame 252 to move back and forth along roller guides 256. In operation, channel 258 provides a conduit from containers 26 to feeder device 24. Feeder device 24 then indexes back and forth to align one angled track connector 250 with channel 258. Angled track connectors are each flared out at a specific angle such that each different angled track element will align with a different track element when lined up with channel 258. Bottles are pushed through each angled track connectors 250 by air supplied by louver 260 and generated by compressor 262.

Figure 3:
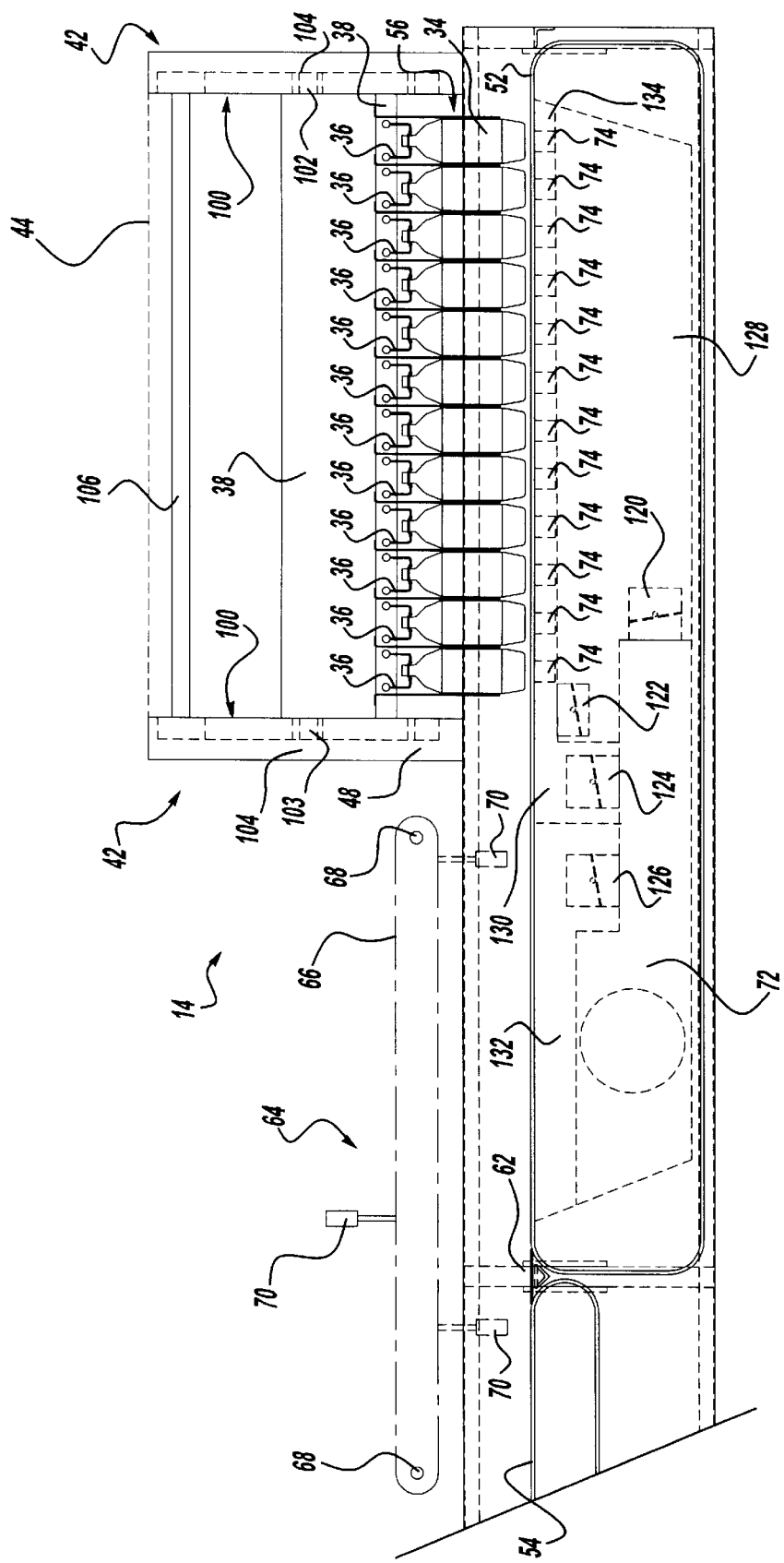
FIG. 3 is a side view of an elevator device according to the present invention.
Figure 3A:
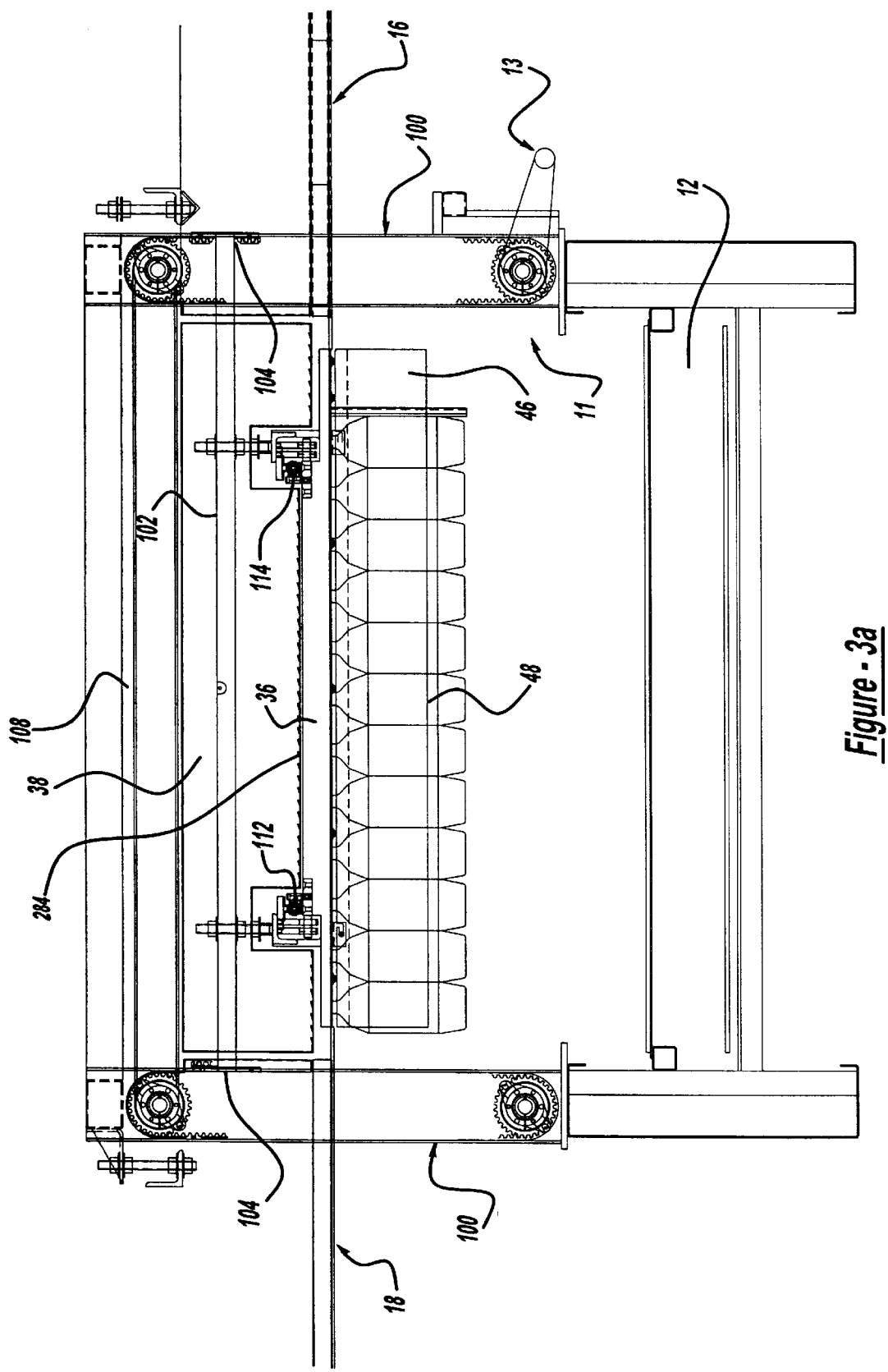
FIG. 3A is a back view of an elevator device according to the present invention.

Referring now to FIGS. 3 and 3A, elevator device 14 is described in greater detail. Elevator device 14 generally includes a plurality of detachable neck guides 36 which are supported by frame 38. Elevator supports 42 engage frame 38 to selectively drive frame 38 up and down as required. When frame 38 is in an up position 44, each detachable neck guides 36 aligns itself with a respective track of track element 28 of first set of neck guides 16 and second set of neck guides 18. Also attached to frame 38 are a plurality of guides 48. Guides 48 act to ensure that each bottle 34 is in an upright and straight position.

On sides of elevator device 14 opposite first set of neck guides 16 and second set of neck guides 18 are located stops 46 (See FIG. 2). Stops 46 act to keep each bottle 34, which enters detachable neck guides 36 from track elements 28, from falling out of elevator device 14. Moreover, stops 46 and detachable neck guides 36 act to collate the set of containers 26 into a rectangular configuration of elevator device 14. Such a rectangular configuration is hereinafter referred to as a bundle. However, it is noted that the bundle need not have a rectangular configuration. It is merely important that each bundle contain a predetermined number of bottles which are organized in a predetermined configuration.

In FIG. 3A, a back view of elevator device 14 is shown with first set of neck guides 16 and second set of neck guides 18 feeding in from the right and left sides respectively. Two chain and sprocket assemblies 100 are shown positioned on opposite sides of frame 38 within elevator supports 42. Top sprockets of each chain and sprocket assembly 100 are connected by timing chain 108. Timing chain 108 ensures that each chain and sprocket assembly in FIG. 3A remains in sync. Each chain of chain and sprocket assemblies 100 is attached to cross bar 102 at connection areas 104. Cross bar 102, in turn, supports frame 38. With reference to FIG. 3, it can be seen that a second set of chain and sprocket assemblies 100 are located on an opposite side of frame 38, with respect to that depicted in FIG. 3A, and thereby support a second cross bar 103. Timing shaft 106 connects the top sprockets of respective chain and sprocket assemblies together as shown. By use of timing shaft 106 and timing chain 108, all chain and sprocket assemblies 100 are ensured to be in sync with the others. This ensures that frame 38 remains parallel when moved upward or downward.

In operation, a servo motor 13 drives sprocket 11 in a first rotational direction. This driving causes rotation of all chain and sprocket drives 100 in a first direction, thereby causing movement of each connection area 104 either upward or downward. This movement causes respective cross bars 102, 103 to move upward or downward thereby resulting in frame 38 moving upward or downward. By actuating servo motor 13 in an opposite direction to that discussed above, frame 38 will be moved in an opposite direction to that discussed above. Lastly, by use of a servo motor, frame 38 can be accurately positioned at a required position.

Figure 14:
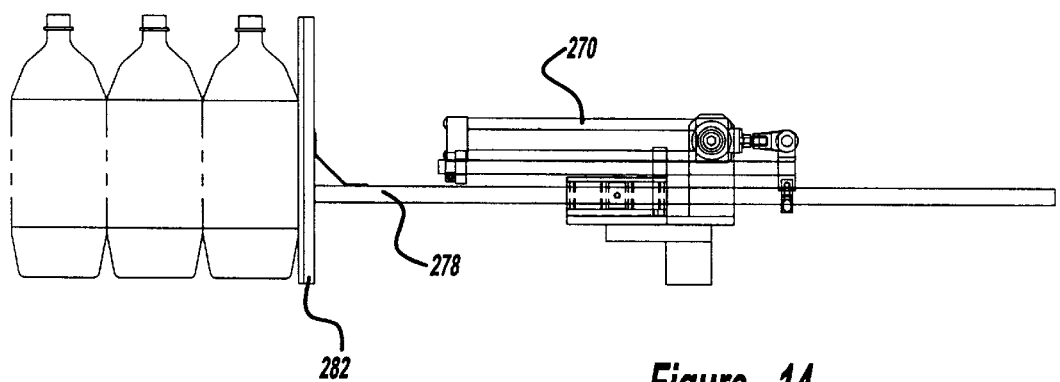
FIG. 14 is a cross sectional view of a stop for a container material handling system according to the present invention.
Figure 15:
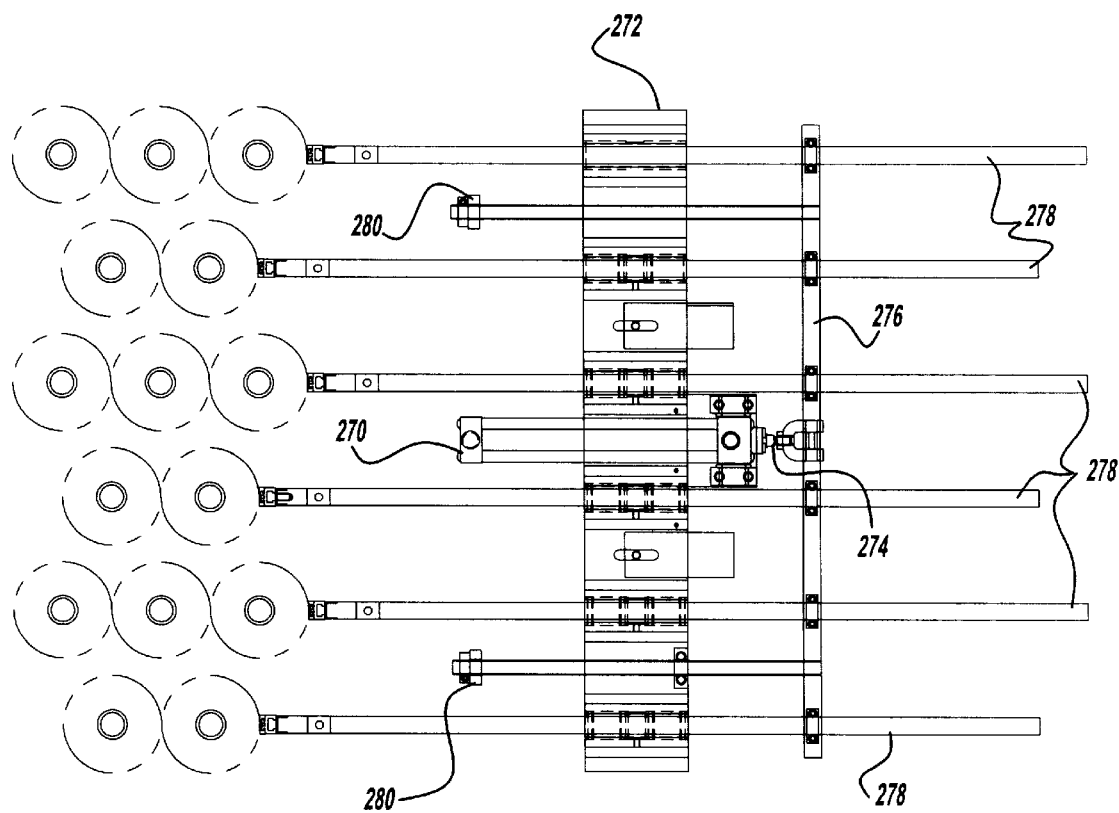
FIG. 15 is a cross sectional view of a stop for a container material handling system according to the present invention.

Referring to FIG. 3A, 14 and 15, stops 46 are described in greater detail. Stop 46 has a hydraulic cylinder 270 which is mounted to support 272. Shaft 274 of hydraulic cylinder 270 is attached to crossbar 276. Crossbar 276, in turn, is attached to stop bars 278 and limit stops 280. Stop bars 278 have a vertical element 282 which acts to limit travel of crossbar 276 and thus vertical elements 282. In operation, bottles are stacked against vertical element 282. Subsequently, hydraulic cylinder 270 is actuated and allows bottles 34 to be moved slightly further away from respective sets of neck guides 16 or 18 (for reasons which will be discussed). Frame 38 contains an air source which pumps air through baffles 284. This air acts to drive bottles 34 against the now moved vertical element 282.

Figure 3B:
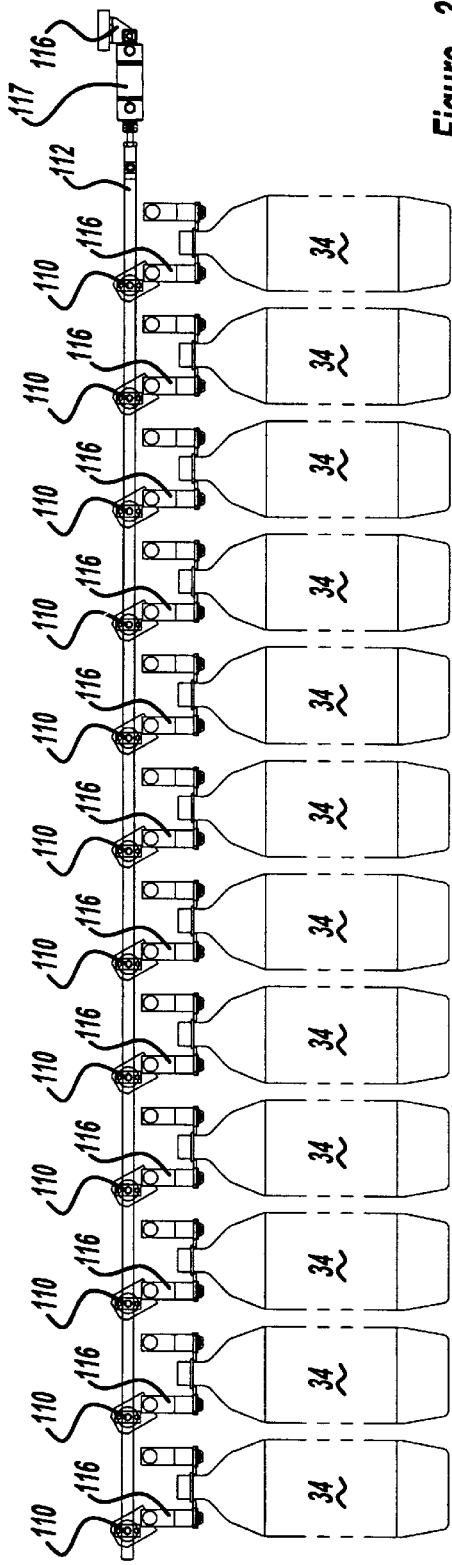
FIG. 3B is a side view of detachable neck guides of an elevator device according to the present invention.
Figure 3C:
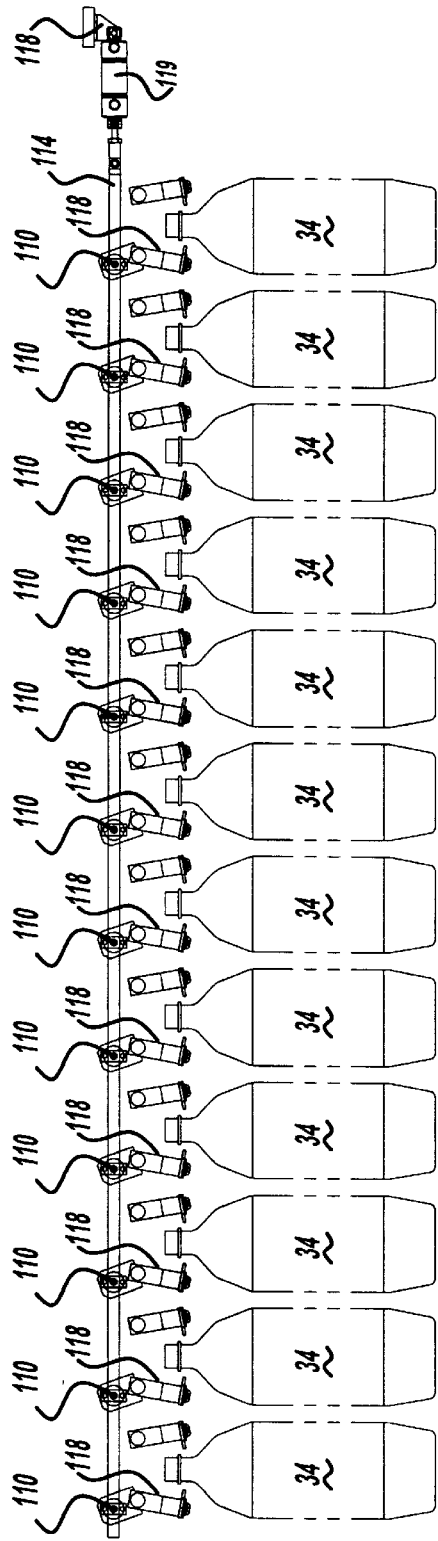
FIG. 3C is a side view of detachable neck guides of a container material handling system according to the present invention.

Referring to FIGS. 3A, 3B, and 3C, detachable neck guides 36 are described in greater detail. Each neck guide 36 has a horizontal portion at its bottom resulting in the neck guide 36 being generally L-shaped. Adjacent neck guides 36 having horizontal portions pointing toward each other form a respective pair of detachable neck guides 36. The horizontal portions act to engage the underside of lip portions of respective bottles. Each neck guide 36 is also pivotally mounted to frame 38 at a respective pivot point 116. From FIG. 3A, it is clear that each detachable neck guide 36 extends from a side proximate first set of neck guides 16 to a side proximate second set of neck guides 18. FIGS. 3B and 3C illustrates the attachment of piston rods 112 and 114 to each respective detachable neck guide 36 from a side proximate first set of neck guides 16. Specifically, piston rod 112 attaches to neck guides 36 by linkage 116 while piston rod 114 attaches to neck guides 36 by linkage 118. From this attachment, each respective bottle 34 is engaged by a pair of respective detachable neck guides 36. Pistons 117 and 119 are, in turn, engaged to respective piston rods 112 and 114. In operation, a control device instructs pistons 117 and 119 to actuate and either release bottles 34 as shown in FIG. 3B or engage bottles 34 as shown in FIG. 3C.

With reference to FIGS. 1 and 3, conveyor element 12 will now be described. Conveyor element 12 has a first belt 52 and a second belt 54 for locomoting bundles of containers to loading area 58. First belt 52 and second belt 54 are each supported by rollers for being moved along a predefined path as is well known in the conveyor art. First belt 52 and second belt 54 meet at a point of adjacency 62.

Figure 4:
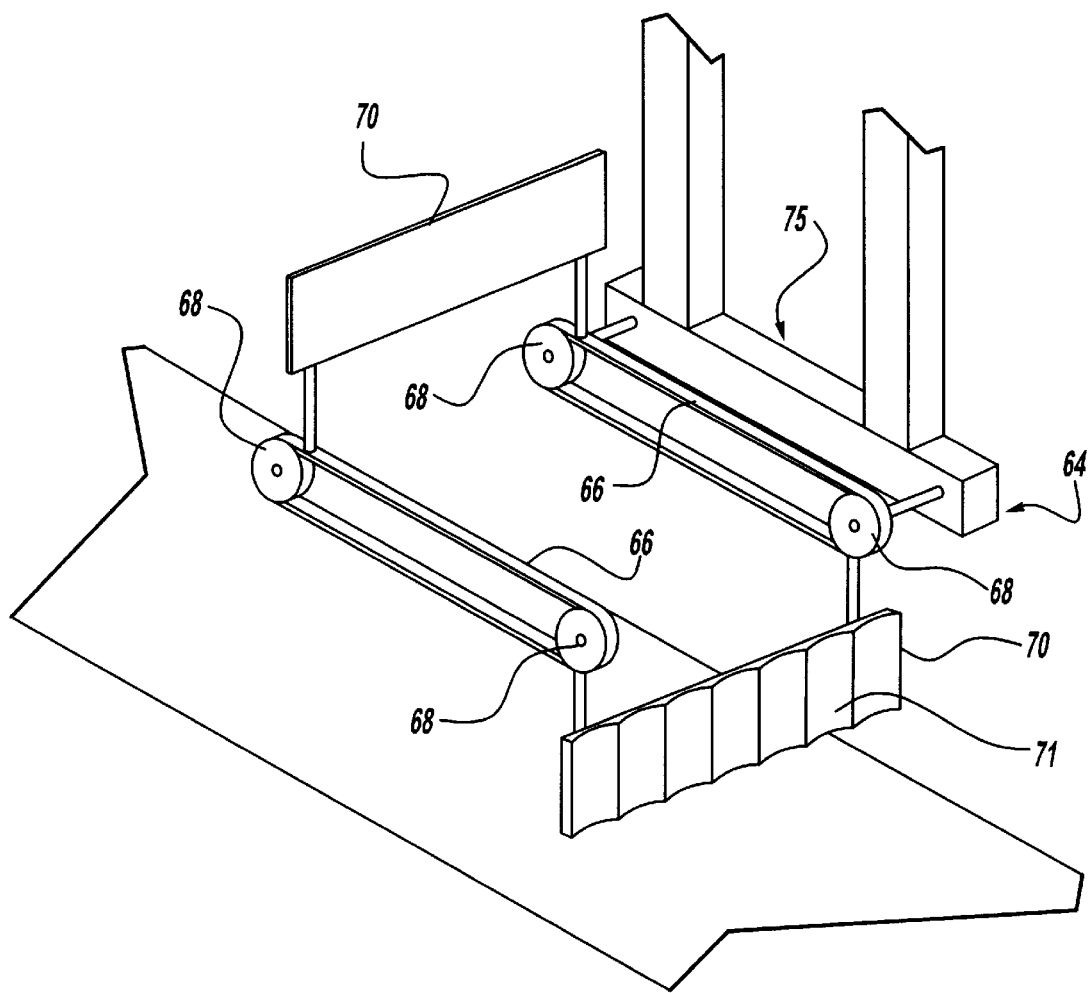
FIG. 4 is a perspective view of a transfer device of a container material handling system according to the present invention.

As shown in FIG. 4, first transfer device 64 is located above first belt 52, second belt 54, and point of adjacency 62 of first and second belts 52 and 54. First transfer device 64 generally includes rotatable drives 66 supported by pulleys 68. Attached to rotatable drives 66 is a plurality of paddles 70. Pulleys 68, in turn, are supported by support 75 (only one support shown, but it is understood that an identical support supports all pulleys). Each paddle 70 has a plurality of grooves 71 which are shaped to receive bottles or other fluid containers. In operation, pulleys 68 drive rotatable drives 66 and cause paddles 70 to move in a clockwise direction. When a bundle is moved from first belt 52 and intersects point of adjacency 62, bottles 34 at the beginning of the bundle are received by grooves 71. Rotatable drives 66 then index forward, allowing the bundle to move under the first transfer device 64 and allowing one paddle 70 to be positioned in front of the bundle and one paddle to be positioned behind the bundle. Because the back of each paddle is flat, not containing grooves 71, the paddle at the rear of the bundle is not engaging the bundle with respective grooves 71. Paddles 70 act to push the bundle across point of adjacency 62 and to second belt 54. Because the paddles contact each bottle of the bundle below its center of mass and because the bottles at this point are organized in a dense bundle, the bottles remain upright during the locomotion caused by paddles 70.

Conveyor element 12 also contains a second transfer device 76 as shown positioned at the end of second belt 54. Second transfer device 76 operates the same as first transfer device 64. As such, paddles 78 act to push bundles from second belt 54 to shipping package 80.

Internal to conveyor element 12 is vacuum pump 72. Vacuum pump 72 acts to evacuate vacuum chambers 128, 130 and 132. This evacuation is accomplished by vacuum 72 drawing air from each respective cavity through valves 120, 122, 124 and 126. Specifically, valve 120 provides evacuation in vacuum chamber 128. Likewise, valve 122 allows the vacuum in vacuum chamber 128 to evacuate vacuum chamber 130. Also, however, valve 124 acts to evacuate vacuum chamber 130. Lastly, valve 126 acts to evacuate vacuum chamber 132. Having multiple vacuum chambers positioned along first belt 52 allows different suction pressure to be applied at different areas along first belt 52.

Plate 134 has a plurality of orifices 74 contained thereon which correspond to the pattern of bottles being delivered by elevator device 14. Plate 134 is removable such that a different plate can be positioned in its place. The vacuum of vacuum chamber 128 acts to draw air through first belt 52 and orifices 74 and pull each bottle to its respective position in alignment with orifices 74. This vacuum action increases the probability that bottles 34, which are lowered to first belt 52, do not fall over. As such, the spacing of each orifice becomes important. Preferably, this spacing is laid out in the same configuration as the desired bundle. This causes each bottle to be pulled by vacuum chamber 128 into the configuration of the desired bundle. Thus, when bottles of different size are being loaded, a different plate having a different orifice configuration can be positioned in lieu of plate 134.

Shipping package 80 is supported by support platform 82 and contains a plurality of previously stacked bundles 84. These bundles are stacked sequentially with respect to each new set of containers 26 which is fed through container handling system 10. Once a predetermined number of stacked bundles 84 are placed in shipping package 80, shipping package 80 is removed by package removal mechanism 20 and replaced with a new pallet 86.

Figure 5:
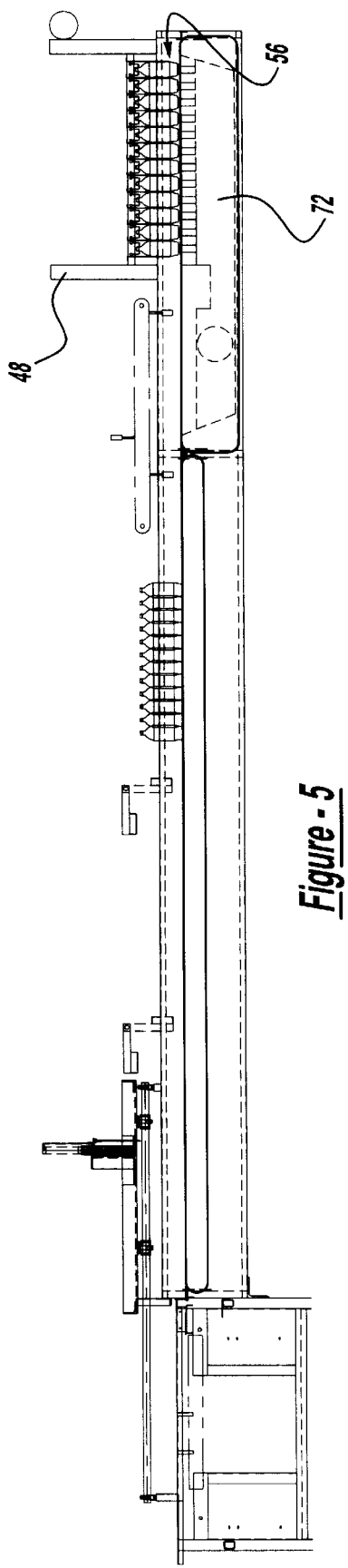
FIG. 5 is a side view of a container material handling system according to the present invention.

Referring now to FIGS. 5–10, the operation of the present invention will now be described. In FIG. 2, bottles 34 are fed along first set of neck guides 16 and second set of neck guides 18 until being stacked in detachable neck guides 36. Once detachable neck guides 36 are full of bottles 34, lane stops 286 close, hydraulic cylinder 270 retracts vertical elements 282 while baffles 284 push the bottles (now organized as a bundle 56 as discussed previously) against vertical elements 282. The air is then cut off and the bottles are lowered onto first belt 52 by elevator supports 42 (as shown in FIG. 5). With continued reference to FIG. 5, vacuum pump 72 draws air through orifices 74 to ensure that bottles 34 of bundle 56 stand upright on first belt 52. Vacuum pump 72 continues this level of vacuum pressure until bundle 56 is positioned on first belt 52. Likewise, first belt 52 remains stationary such that bundle 56 is not being positioned on a moving target. After bundle 56 is positioned on first belt 52, vacuum pump 72 reduces the amount of vacuum pressure being exerted on bundle 56.

Figure 6:
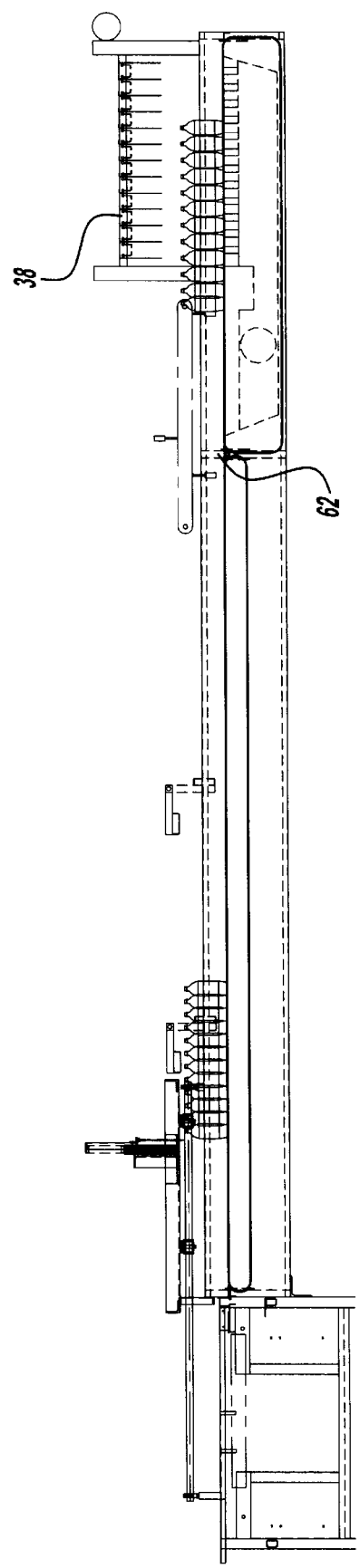
FIG. 6 is a side view of a container material handling system according to the present invention.
Figure 7:
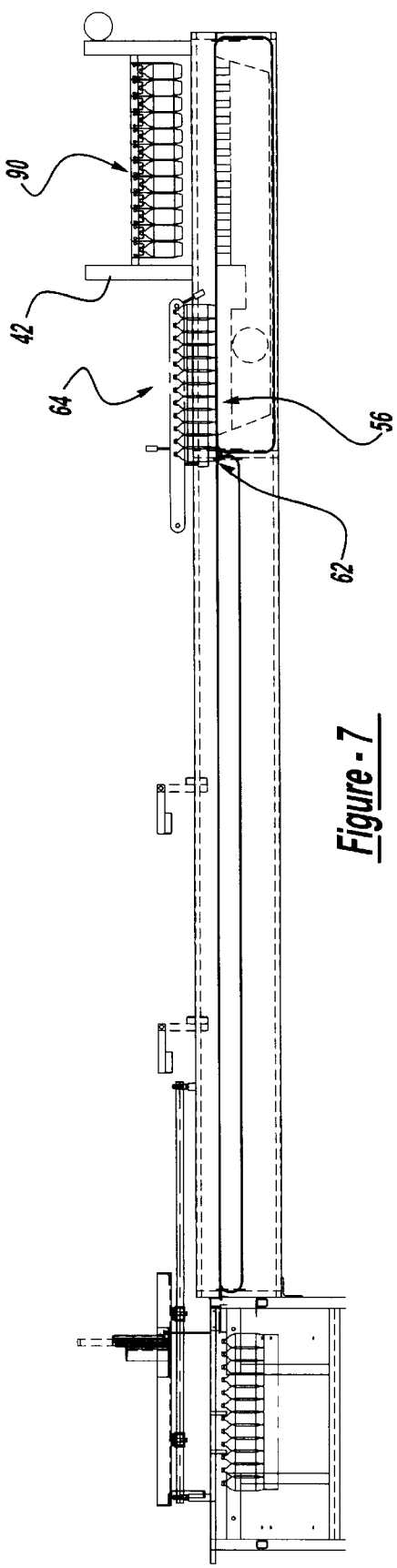
FIG. 7 is a side view of a container material handling system according to the present invention.
Figure 8:
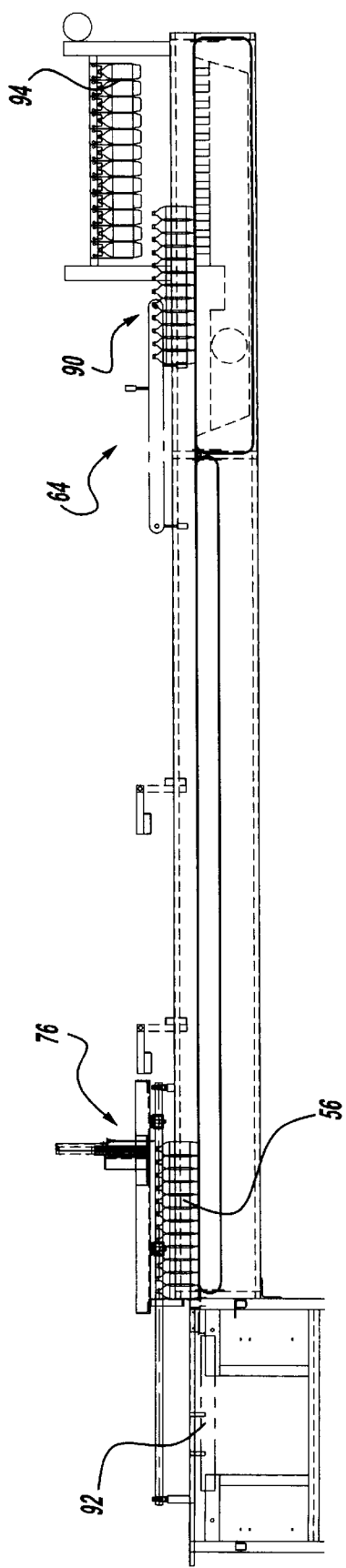
FIG. 8 is a side view of a container material handling system according to the present invention.

With reference to FIG. 6, first belt 52 begins moving to locomote bundle 56 toward point of adjacency 62. Simultaneously, vacuum chamber 130 and 132 is evacuated. This evacuation ensures that vacuum pressure is being exerted on bundle 56 while it moves along first belt 52. Frame 38 moves toward an upward position in anticipation of receiving a subsequent sequential bundle of bottles 34. In FIG. 7, bundle 56 is engaged by first transfer device 64. Specifically, rotatable drive 66 of first transfer device 64 remains still, thereby allowing bundle 56 to abut against it to further ensure the bundle is dense. Simultaneously, suction from vacuum chambers 130 and 132 act to pull the front bottles of bundle 56 against paddle 70. After a predetermined amount of time, rotatable drive 66 actuates and pushes bundle 56 across point of adjacency 62. By this way, bundle 56 is not hung up on the nonmoving point of adjacency 62. Rotatable drive 66 rotates at the same speed which second belt 54 moves. As a result, bundle 56 is moved along the beginning of second belt 54 at the same rate of speed which second belt 54 is moving. As such, the relative velocity between these two elements is zero, thereby further reducing the probability that any bottle of bundle 56 will tip. While first transfer device 64 pushes bundle 56 across point of adjacency 62, a second sequential bundle is loaded by elevator supports 42 onto first belt 52. In FIG. 8, second belt 54 has locomoted bundle 56 into engagement with second transfer device 76. Like first transfer device 64, second transfer device 76 pushes bundle 56 from second belt 54 onto pallet 92. Simultaneously, a third sequential bundle 94 is loaded onto first belt 52.

Figure 9:
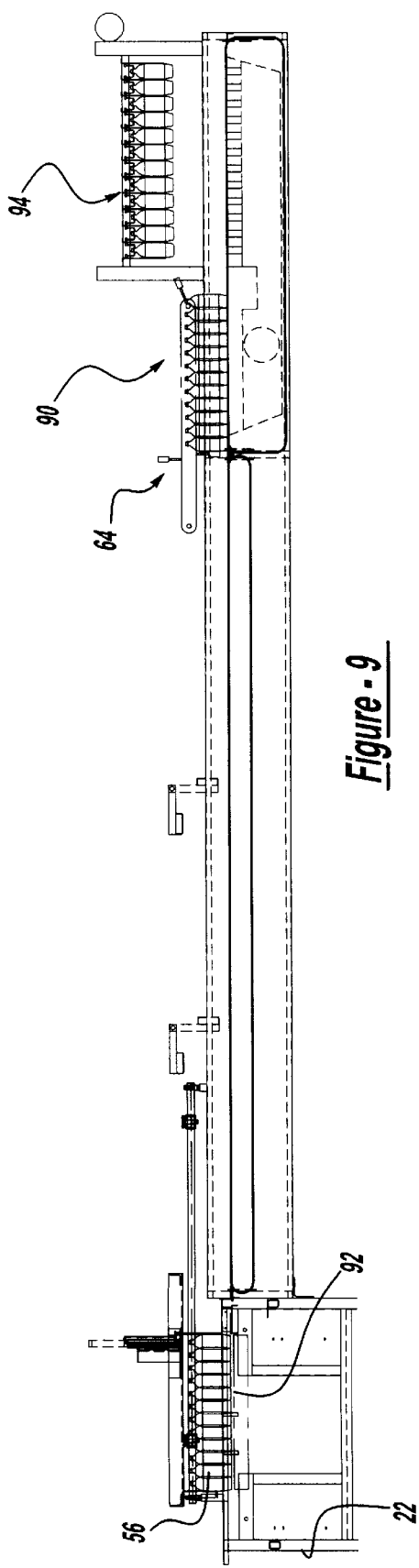
FIG. 9 is a side view of a container material handling system according to the present invention.
Figure 10:
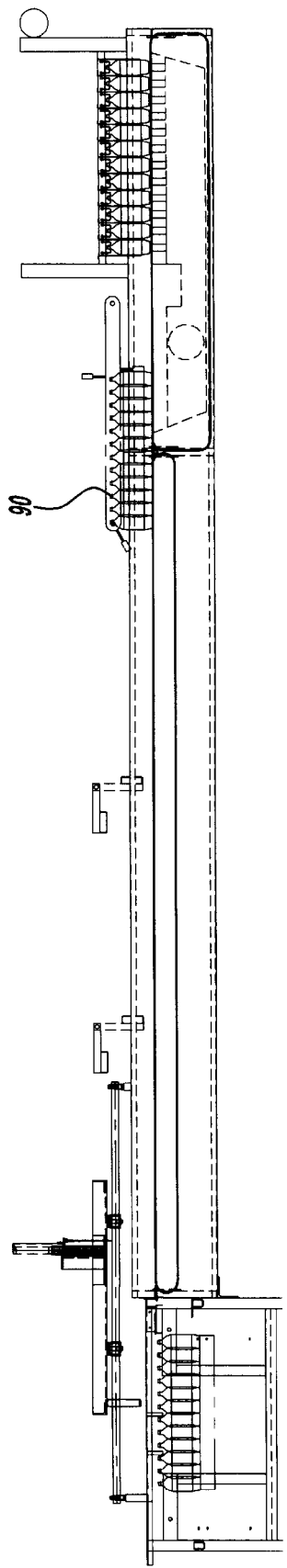
FIG. 10 is a side view of a container material handling system according to the present invention.
Figure 11:
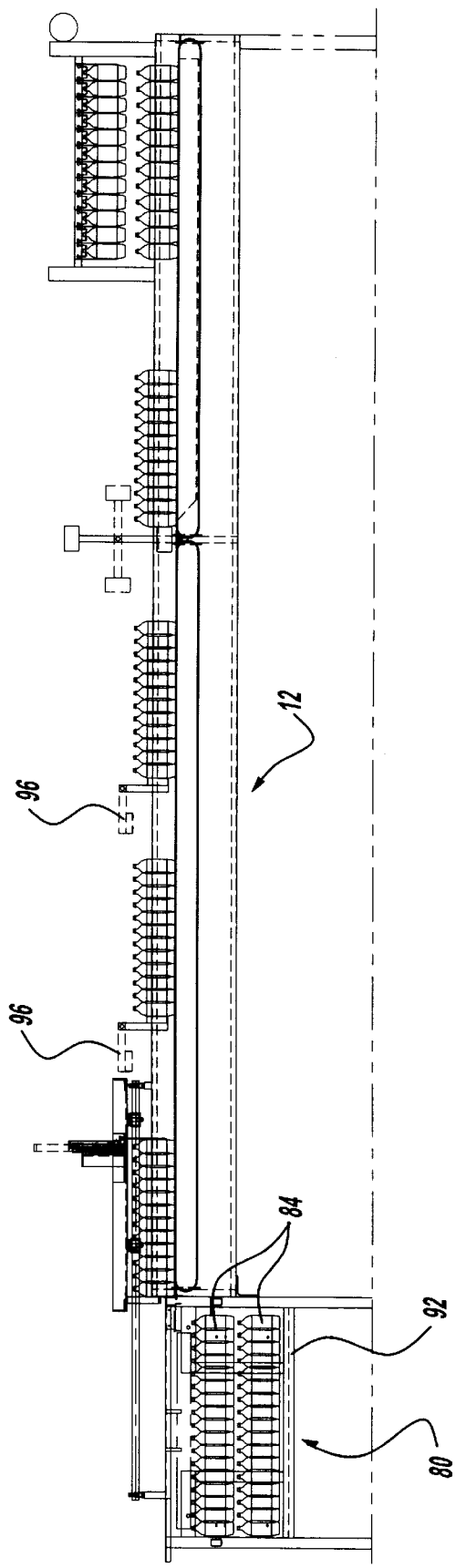
FIG. 11 is a side view of a container material handling system according to the present invention.

In FIGS. 9 and 10, bundle 56 is loaded onto pallet 92 by second transfer device 76. Once loaded, pallet holder 22 allows pallet 92 to index downwardly as shown in FIG. 10, thereby allowing room for second sequential bundle 90 to be slid thereon. As shown in FIG. 11, bundles are loaded until a predetermined number of stacked bundles 84 are stacked as shown. Once fully stacked, the stacked bundles 84 and pallet 92 (referred to collectively as the shipping package 80) are removed by packaging removal mechanism 20 (see FIG. 1). During this time, a plurality of stops 96 are engaged and keep any further bundles from traveling along conveyor element 12. This provides the required time to remove shipping package 80 and replace it with a new pallet 92.

Figure 12:
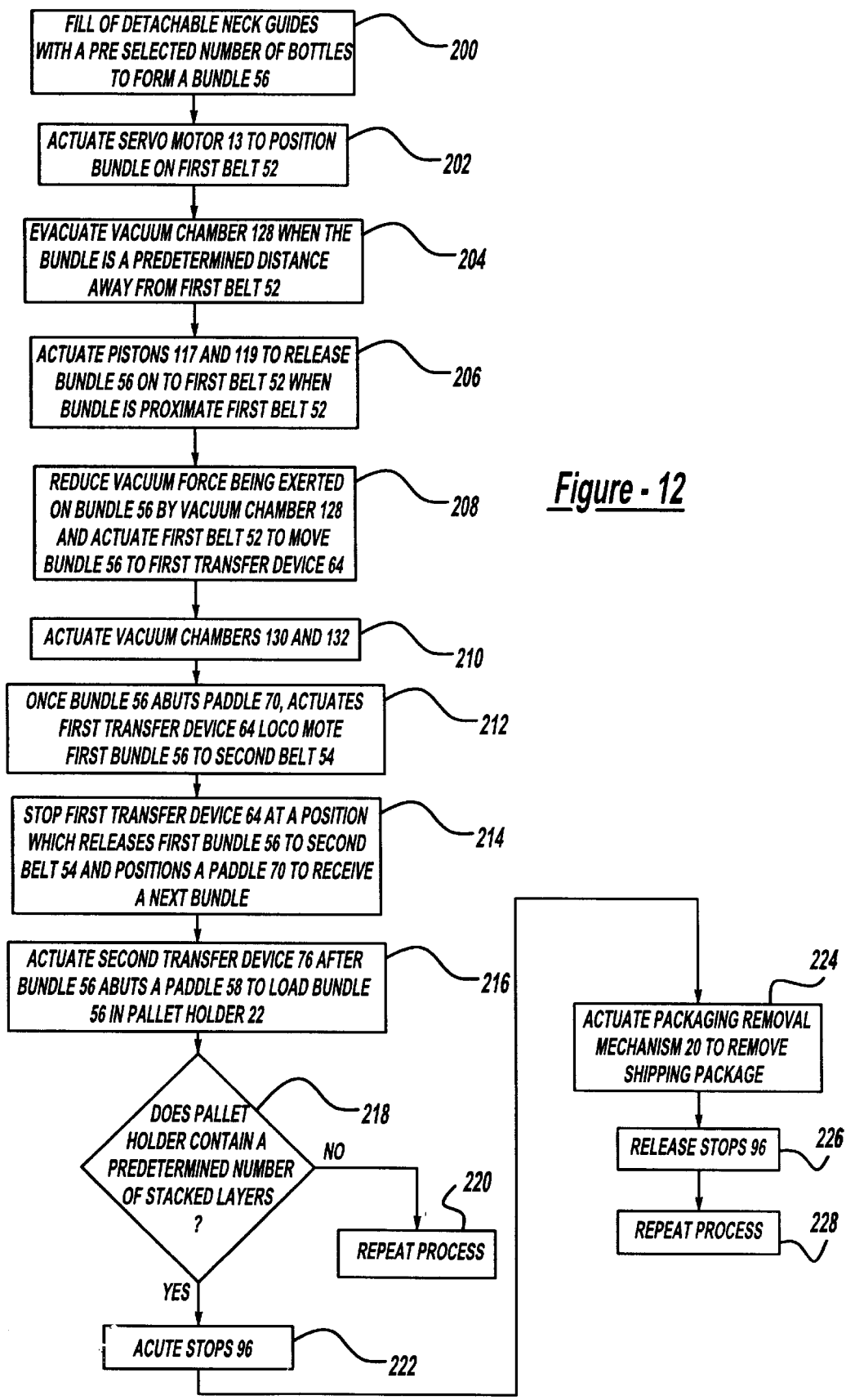
FIG. 12 is a flow diagram of the operation of a container material handling system according to the present invention.

Referring to FIG. 12, a flow chart depicting the operation of a governing control system for the present invention is shown. In FIG. 12, the operation starts with block 200 where each pair of detachable neck guides is filled with a preselected number of bottles to form bundle 56. Here, detachable neck guides 36 are filled with bottles 34, lane stops 96 close, hydraulic cylinder 270 retract vertical elements 282 while baffles 284 push the bottles (now organized as a bundle 56 as discussed previously) against vertical elements 282. Preferably, bundle 56 is rectangular in shape. Next, in block 202, servo motor 13 is actuated to position bundle 56 on first belt 52. Before bundle 56 is positioned on first belt 52, however, vacuum chamber 128 is evacuated when the bottom of bundle 56 is a predetermined distance away from first belt 52. This occurs in block 204. Once bundle 56 is on first belt 52, pistons 117 and 119 are actuated causing release of bundle 56 onto first belt 52. This occurs in block 206. The vacuum force exerted on bundle 56 by vacuum chamber 128 is then reduced and first belt 52 is actuated to move bundle 56 to first transfer device 64. This occurs in block 208. In block 210, vacuum chambers 130 and 132 are then actuated. Once bundle 56 is abutting a paddle 70, the first transfer device 64 is actuated to move first bundle 56 to second belt 54. This occurs in block 212. First transfer device 64 is then stopped, in block 214, at a position which releases first bundle 56 to second belt 54 and positions a paddle 70 to receive a next bundle. Second transfer device 76 is then actuated, in block 216, when bundle 56 abuts a paddle 58 to load bundle 56 in to pallet holder 22. The decision block 218 determines whether the pallet holder 22 is full. If it is not, then block 220 repeats the above process until full. If it is, then block 222 actuates stops 96 while block 224 removes the shipping package and replaces it with a new pallet. Block 226 and 228 then release stops 96 and repeats the above process to form a new shipping package.

The present invention is a device which stacks finished product prior to shipment. Finished product will be stacked in layers separated by a tier sheet. An individual layer will have a pattern so that the load will be stable for shipment and so that the manufacturer will know how many pieces are on each load. After the product is stacked, it will be banded and wrapped before shipment.

The present invention will provide for a high speed machine which will pattern bottles without tipping any or leaving any voids. Voids in the pattern throw off the product count and tipped bottles require operator intervention. Freshly blown bottles have a high coefficient of friction so they are difficult to pattern. Empty bottles with a neck ring and feet are very unstable.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A method for packaging a plurality of containers, each of said plurality of containers having a body portion transitioning to a neck portion at an upper end of said body portion, said body portion having a bottom opposite said neck portion, said neck portion having an engagement lip extending outwardly from an outer periphery of said neck portion, said method comprising the steps of:

A. providing a set of said containers;
  B. loading said set of containers on a transporting device;
  C. locomoting said set of containers via said transporting device to an elevator system to form a bundle of said containers;
  D. moving said bundle onto a locomoting device with said elevator system;
  E. transporting said bundle along a path to a loading area; and
  F. stacking said bundle on a pallet.

2. The method as claimed in claim 1, wherein said locomoting device is a conveyor.

3. The method as claimed in claim 2, wherein said transporting device is at least one set of neck guides.

4. The method as claimed in claim 3, wherein said transfer device is positioned above said loading area and said conveyor, said transfer device comprising at least one paddle element for pushing said bundle from said conveyor to said pallet.

5. The method as claimed in claim 3, wherein said at least one set of neck guides comprises:

a first set of neck guides, said first set of neck guides feeding a portion of said set of containers from a first side of said conveyor, said portion of said set being fed in a direction substantially perpendicular to said path; and a second set of neck guides, said second set of neck guides feeding a remainder of said set of containers from a second side of said conveyor, said remainder of said set being fed in a direction substantially perpendicular to said path.

6. The method as claimed in claim 3, wherein steps A through F are repeated for a plurality of sequential sets of said containers, each of said plurality of sequential sets corresponding to a sequential bundle, a transfer device stacking each of said sequential bundles on a previous bundle to form a shipping package.

7. The method as claimed in claim 6, further comprising at least one stop positioned along said path, wherein said stop selectively prohibits said sequential bundles on said conveyor from being locomoted along said path, whereby said sequential bundles on said path are prohibited from being loaded to allow said shipping package to be discharged.

8. The method as claimed in claim 3, wherein said conveyor includes at least a first belt for supporting and locomoting said bundle.

9. The method as claimed in claim 8, wherein said conveyor includes a vacuum element, said vacuum element acting to draw said bottom against said first belt when said bundle is transported by said conveyor, whereby said vacuum element acts to enhance support of said bundle by said first belt.

10. The method as claimed in claim 8, wherein said conveyor includes a second belt adjacent to said first belt at a point of adjacency, wherein step E comprises locomoting said bundle from said first belt to said second belt at said point of adjacency, said second belt transporting said bundle to said loading area.

11. The method as claimed in claim 10, further comprising a first transfer device for transferring said bundle from said first belt to said second belt.

12. The method as claimed in claim 11, wherein said first transfer device is positioned above said point of adjacency, said first transfer device comprising at least one paddle element for pushing said bundle from said first belt to said second belt.

* * * * *